United States Patent [19]

Bertelsen

[11] 3,827,527

[45] Aug. 6, 1974

[54] GIMBAL GROUND EFFECT VEHICLES

[76] Inventor: William R. Bertelsen, Rock Island, Ill.

[22] Filed: Jan. 18, 1971

[21] Appl. No.: 107,350

Related U.S. Application Data

[63] Continuation-in-part of Ser. No. 779,988, Nov. 29, 1968, abandoned.

[52] U.S. Cl................ 180/120, 244/23 A, 180/124
[51] Int. Cl............................................. B60v 1/14
[58] Field of Search .......... 180/117, 120, 121, 122; 244/12, 23 R, 23 A, 23 B, 23 C, 23 D; 248/180, 182

[56] References Cited
UNITED STATES PATENTS

| | | | |
|---|---|---|---|
| 1,957,896 | 5/1934 | Marguglio | 244/23 R |
| 2,176,476 | 10/1939 | Twining | 244/56 |
| 2,715,007 | 8/1955 | Zeitlin | 248/180 |
| 2,939,654 | 6/1960 | Coanda | 244/23 C |
| 2,955,780 | 10/1960 | Hulbert | 244/23 R |
| 2,981,501 | 4/1961 | Schaefer | 180/117 |
| 2,989,269 | 6/1961 | Lebel | 180/117 |
| 3,066,753 | 12/1962 | Hurley et al. | 180/120 |
| 3,140,687 | 7/1964 | Beardsley | 180/120 |
| 3,159,361 | 12/1964 | Weiland | 180/117 |
| 3,209,848 | 10/1965 | Holloway | 180/121 |
| 3,261,419 | 7/1966 | Kaario | 180/120 |
| 3,313,366 | 4/1967 | Dionisio et al. | 180/120 |

FOREIGN PATENTS OR APPLICATIONS

| | | | |
|---|---|---|---|
| 921,267 | 3/1963 | Great Britain | 180/117 |

*Primary Examiner*—Kenneth H. Betts
*Assistant Examiner*—John P. Silverstrim
*Attorney, Agent, or Firm*—Henderson & Strom

[57] ABSTRACT

Ground effect vehicles including power means for providing a flow of gas and gimbal mounted flow-directing means for selectively directing the flow of gas into a lift component and a propulsion or control component. The propulsion or control component acts directly from the flow-directing means and is directed over the top of a deck or platform. Single and multi-engine versions are disclosed, and eye lid devices which cooperate with the flow-directing means to reduce loss of lift-gas are described.

10 Claims, 20 Drawing Figures

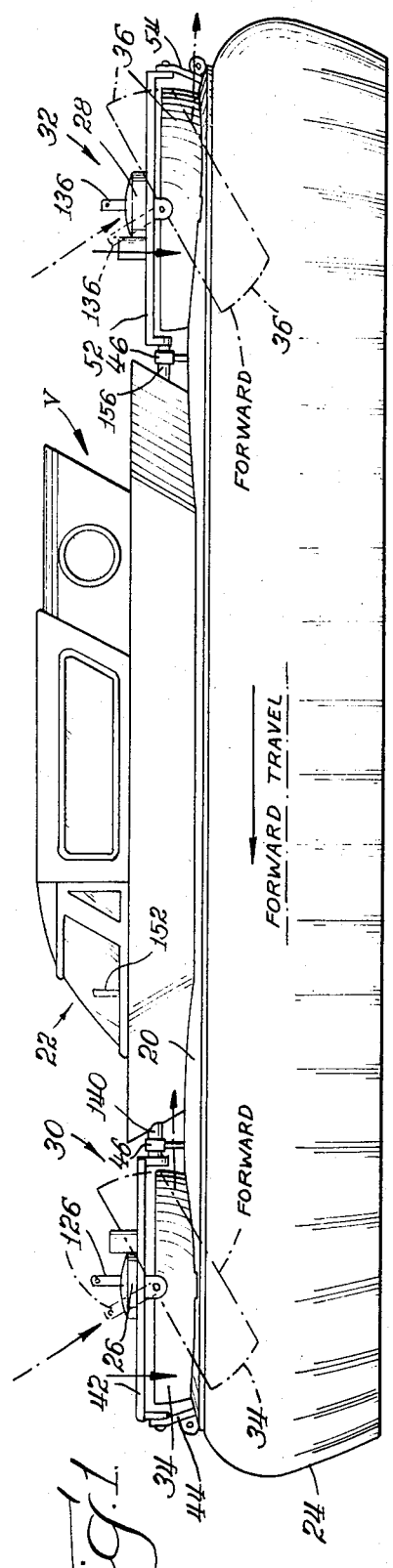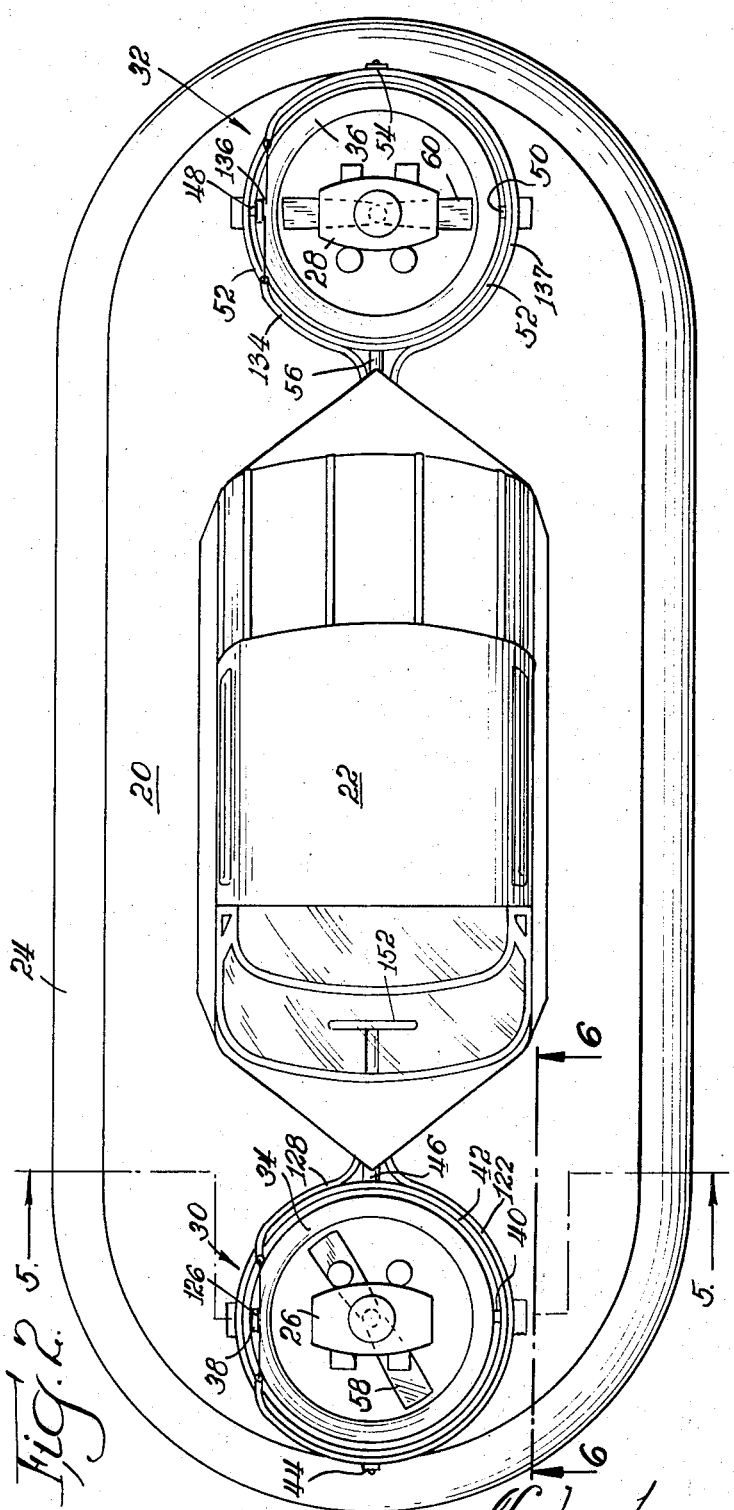

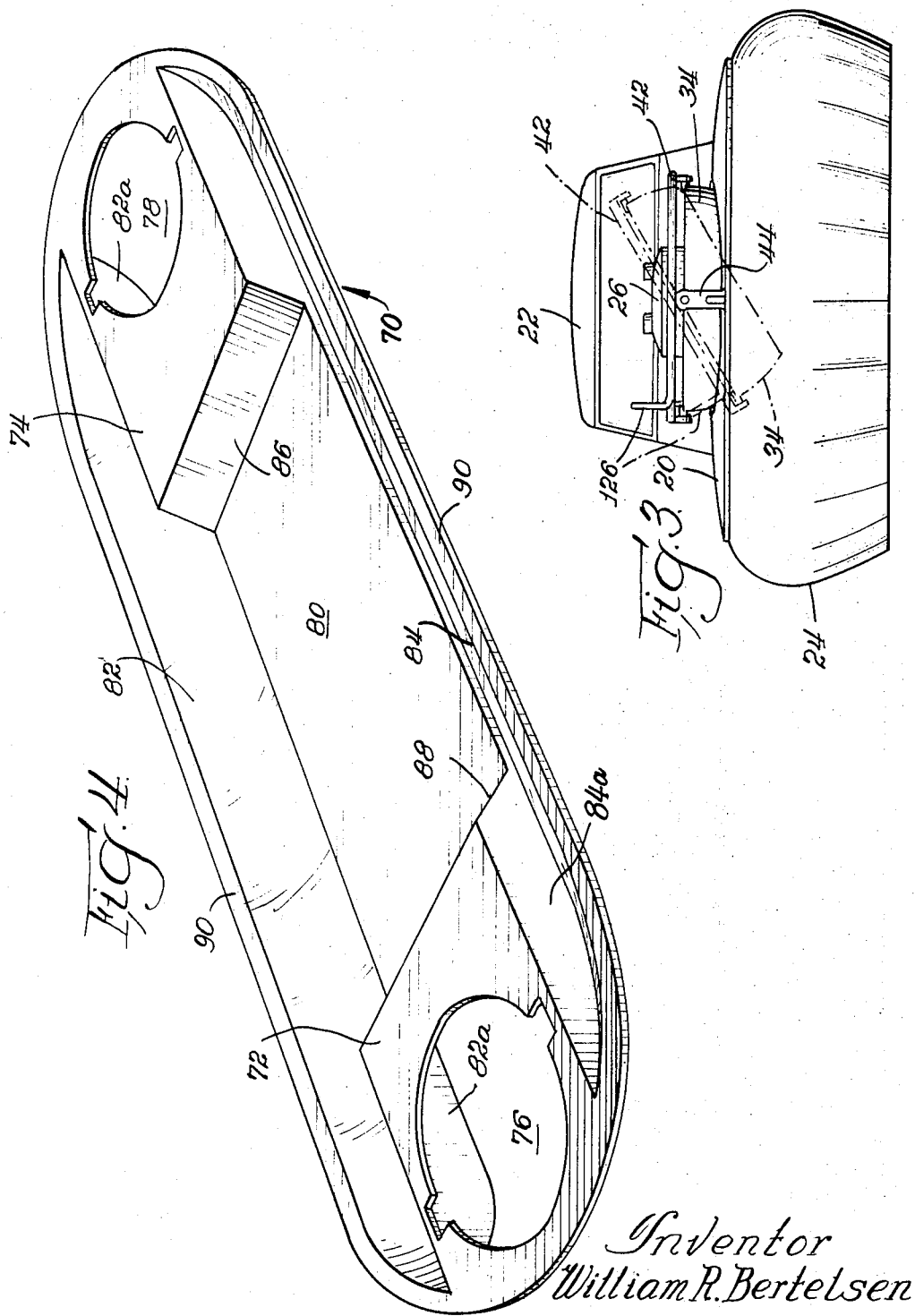

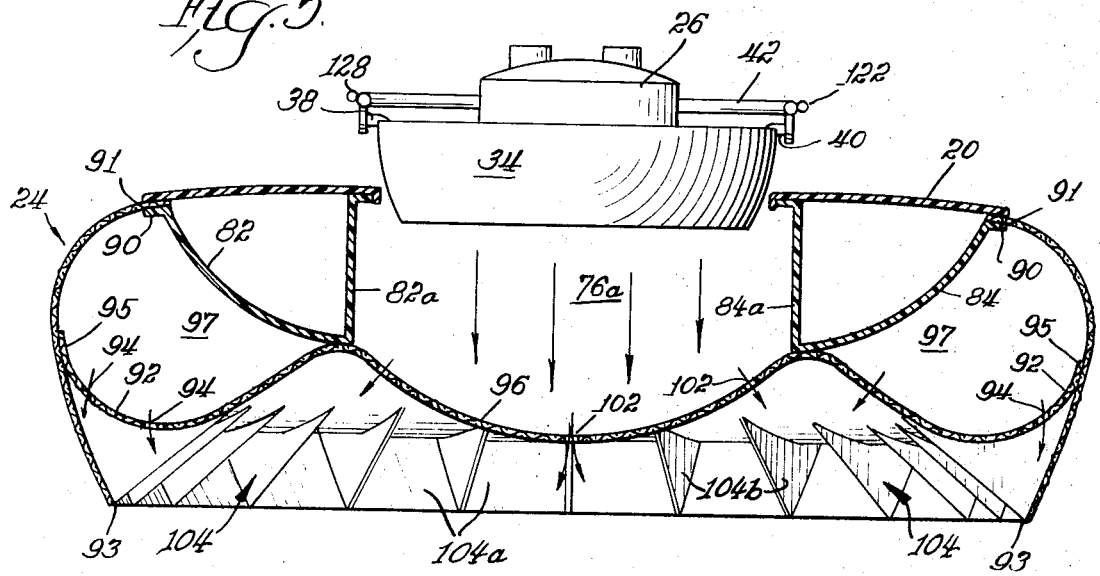
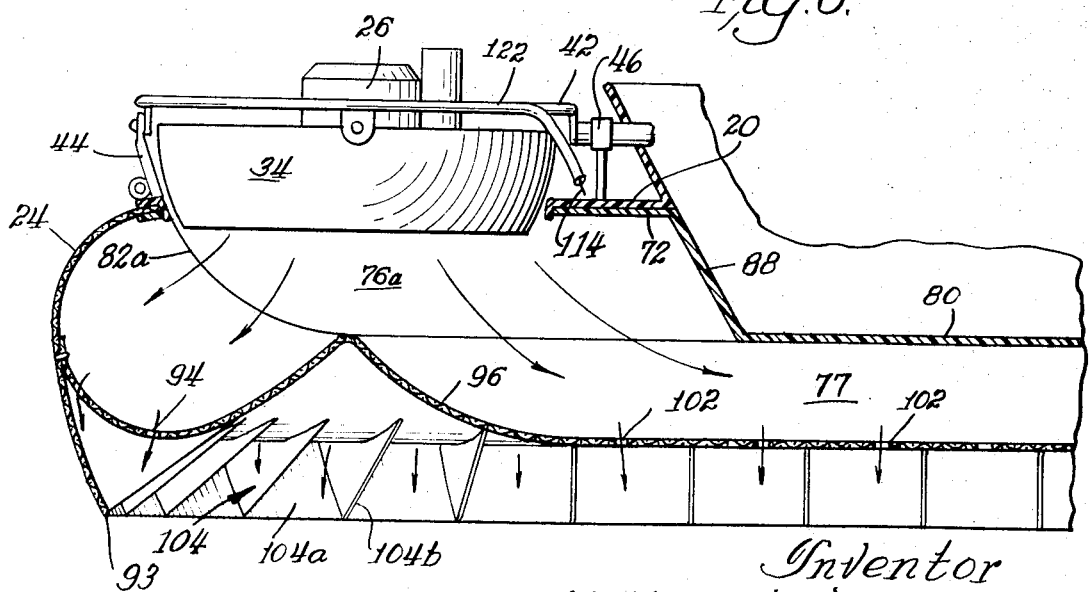

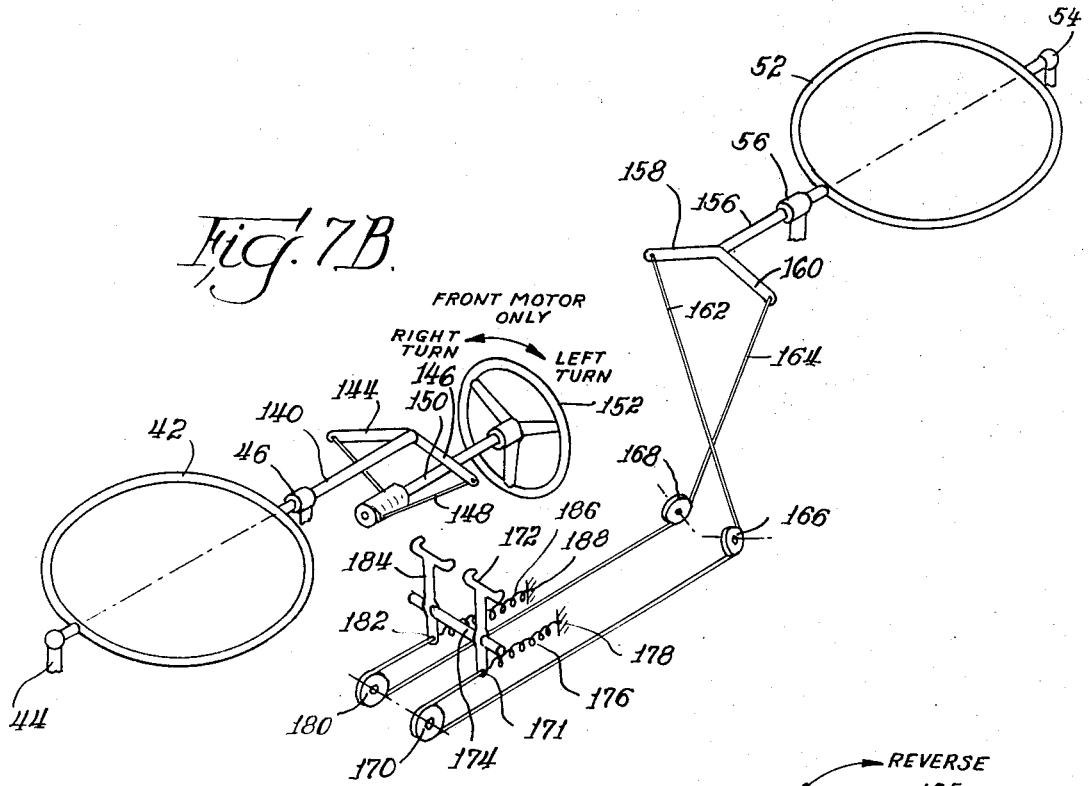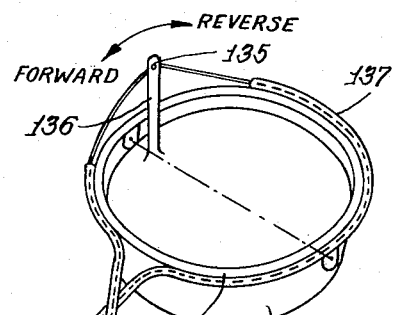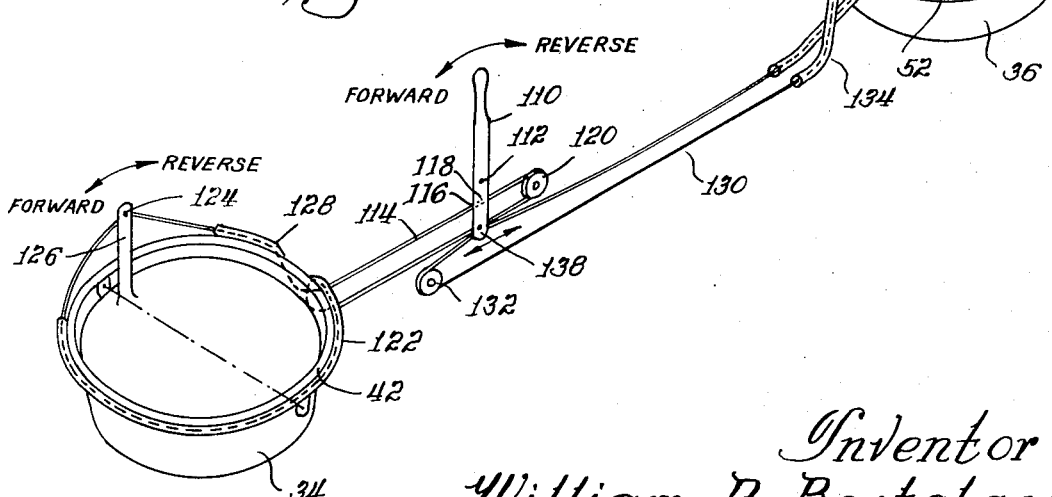

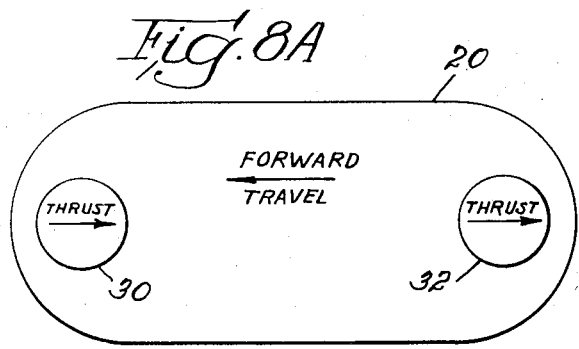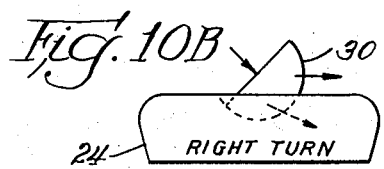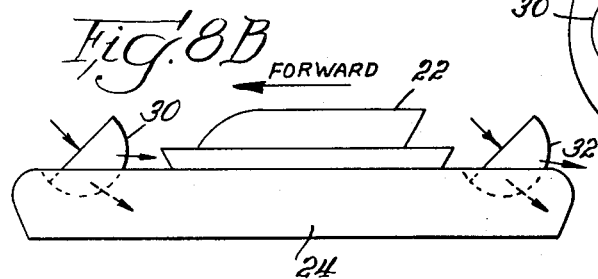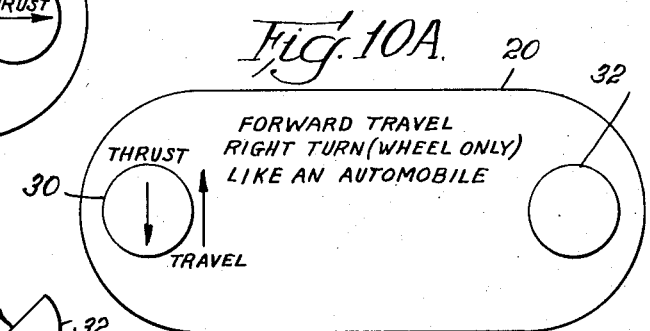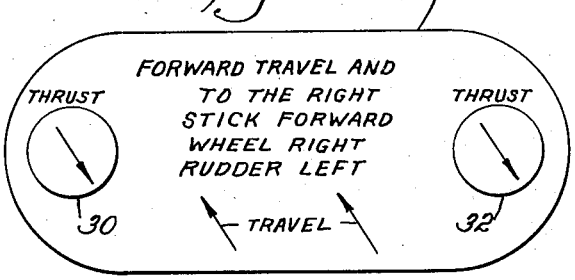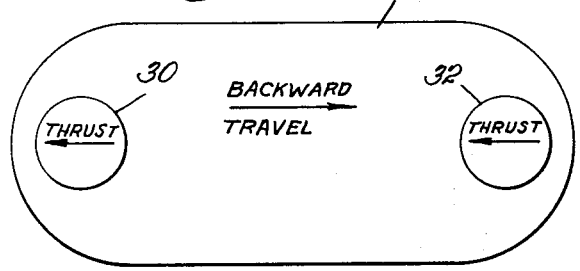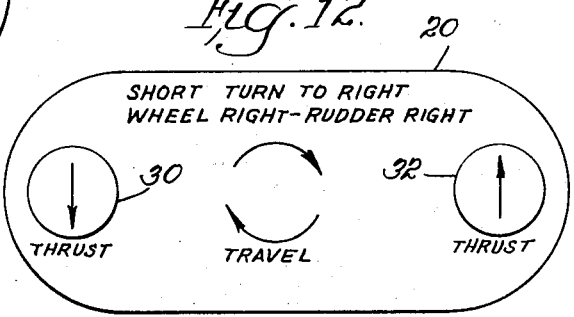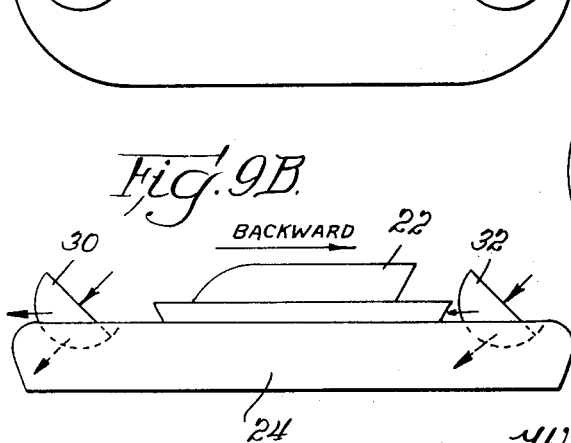

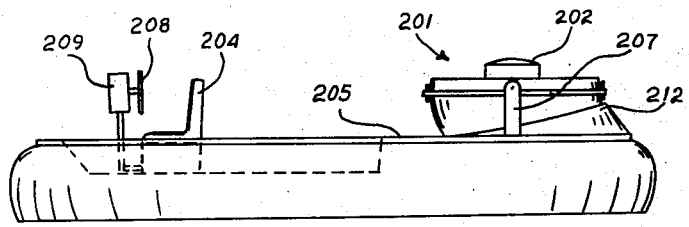
FIG. 13
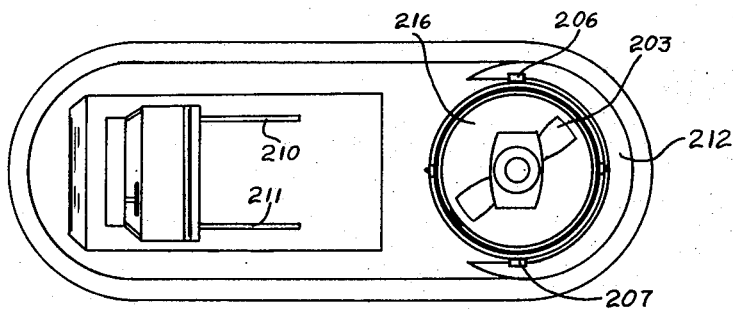
FIG. 14
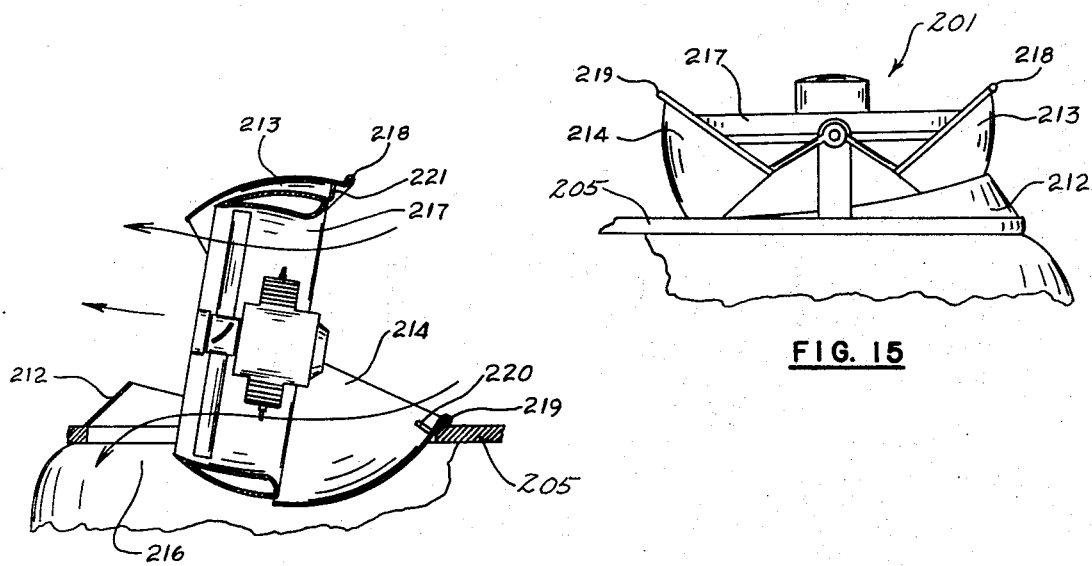
FIG. 16
FIG. 15

GIMBAL GROUND EFFECT VEHICLES

CROSS-REFERENCE TO RELATED APPLICATION

This is a continuation-in-part of my copending application Ser. No. 779,988 filed Nov. 29, 1968 and now abandoned.

BACKGROUND OF THE INVENTION

The present invention relates broadly to aircraft and is more particularly directed to what are commonly called ground effect or air-cushion vehicles. These vehicles in general are operable upon a cushion of air or other compressible fluid entrapped between the vehicle and the surface over which the vehicle travels. The vehicles are operable over a variety of surfaces such as water, snow, ice, ground or pavement. A supply of compressible fluid is generally provided by a turbine or motor and fan arrangement, and the fluid is forced through an opening in the platform or deck of the vehicle into a plenum chamber bounded by a flexible skirt depending downwardly from the vehicle deck and generally circumscribing the vehicle. In the past, difficulty has been encountered in the design and operation of such ground effect vehicles, primarily due to an inability to properly control movement of the vehicle. The vehicles have poor directional stability and yaw orientation control due to the lack of direct frictional contact between the vehicle and the surface over which it is operating. Prior attempts have been made to provide directional orientation control by various means including rudders, swiveling propulsion fans, puff-ports, manipulation of the skirt shape, and various combinations thereof. These attempts resulted in structures which are complicated in design, inefficient in operation and expensive in production. Where control is attempted by use of lift gas, such as in using puff-ports or skirt shape manipulation, it has generally been found that the lift gas does not escape with sufficient velocity to provide effective control. The use of rudders or pivotal propulsion fans, even in combination, is also unsatisfactory, primarily due to an inherent tendency of the vehicle to act as a weathercock, particularly when hovering or traveling at slow speeds with a tail wind. In cases where propulsion is provided by a large propeller or propellers mounted high above a deck, the propulsion force acts through a long lever arm over the center of gravity, and produces objectionable pitch forces, or in the case of swivelled propellers, pitch and roll forces. These forces tend to force the nose down and/or the vehicle over on its side at high thrust levels, and tend to cause the craft to "plow in" or roll over. This tendency is especially troublesome when operating a conventional air cushion vehicle over rough or choppy water.

The inherent ability of ground effect vehicles to move omni-directionally, both horizontally and in yaw axis rotation, results in serious control problems on inclined surfaces. Considerable force must be exerted on the freely suspended vehicle merely to maintain the gas cushion relationship with an inclined surface, such as a hillside. Moreover, additional control force is required to maintain a desired yaw orientation of the vehicle on such surfaces. In summary, the inclined plane gravitational forces acting on the vehicle must be overcome by greater counteracting control forces which must be available to the pilot of the vehicle in order to maintain the vehicle on an inclined surface and to climb such a surface.

Maintaining the yaw axis orientation of the vehicle on uneven terrain is also a complex control problem. For example, as the vehicle proceeds over an uneven surface, the front end of the vehicle may be on a right sloping surface and the rear end on a left sloping surface. Such relationship of the vehicle to these surfaces will cause a right turning moment to act on the vehicle about the yaw axis. Thus in this example the pilot, for optimum control to cause the front end of the vehicle to move to the right or to the left despite the unevenness of the terrain, and likewise must have available and under his control sufficient counteracting forces to control movement of the rear end of the vehicle under all operating circumstances. As another example, for optimum control the pilot should have available control of a sufficient counteracting lateral force on both the front and rear ends of the vehicle to maintain the vehicle on the side of a hill. In addition, if forward or rearward movement along the side of a hill is desired, sufficient propulsion forces, as well as the aforementioned counteracting forces, will be required.

SUMMARY OF THE INVENTION

In accordance with the present invention, the foregoing problems and difficulties of prior art ground effect vehicles are substantially eliminated, and positive control of directional stability and yaw orientation is obtained. This invention provides a ground effect vehicle having power means for providing a flow of gas, and gimbal mounted flow-directing means for selectively directing a part of the flow of gas into a plenum chamber located beneath a platform provided on the vehicle. The aforementioned flow-directing means, due to the gimbal mounting, can be manipulated to direct a portion of the flow of gas directly out over the vehicle platform such that the gas flow has a horizontal component in any desired direction, thus providing a propulsion or control component in any desired horizontal direction utilizing gas directly from the flow-directing means. With the gimbal, the thrust can be metered as desired in varying magnitudes and in any direction about the yaw axis. The vehicle can be pivoted in place, or instantaneously receive a desired amount of thrust forward, rearward, or in any side direction as needed. Also, during turns in the devices of this invention having flow directing means at the fore and aft ends of the vehicle, the forces about the roll axis can be controlled to at least partially counteract the natural tendency of the vehicle to roll to the outside of the turn, thus reducing the chances of roll over during turning. Even with a single flow-directing means, the forces about the roll axis, while working against the operator, act through a much shorter lever arm than in the case of high mounted propellers.

In accordance with one preferred embodiment of the invention, plural gimbal mounted flow directing means are provided, such as near the fore and aft ends of the vehicle, to provide optimum control of the vehicle as will be described more completely hereinafter.

In accordance with another preferred embodiment of the invention, a single gimbal-mounted flow directing means is provided. Although control of this type vehicle is not quite as flexible as in the case of plural flow-directing means, the single flow-directing means embodiment has the advantages of simplicity of design, control and operation, plus lower cost and weight.

In one specific embodiment of the present invention, a ground effect vehicle is provided including gimbal mounted motors and fan means located adjacent each end of an elongated platform base. The motor and fan means, when the fan discharges are downwardly oriented, provide only lift to the vehicle. When tilted in the same direction, the motor and fan means may provide forward, reverse, or lateral propulsion of the vehicle to the right or left. When oriented oppositely, the motor and fan means can control turning, yaw, and roll motion of the vehicle. Not only do the motor and fan means provide lift, but when tilted in their gimbal mounts they provide partial slip stream release having a horizontal component in any one of 360° while simultaneously maintaining the vehicle lift pressure with the remainder of the slip stream. Thus, the pilot has available vehicle attitude control forces which may equal one-half of the total available propulsive force from each end in any horizontal direction while maintaining sufficient lift forces for the vehicle.

The power means for providing a flow of gas may be any one of several types, such as a motor and fan, a turbine engine, or other. The power means may be carried by the flow-directing means as depicted hereinafter, or may be located separately and be provided, for example, with flexible ducting to conduct the flow of gas to the flow-directing means. Further, in the case of plural flow-directing means, a separate power means may be provided for each, or a single power means may provide gas flow to a plurality of flow-directing means. Also, the power means providing gas flow to the flow-directing means may be independent of other means providing only lift gas. For example, one or more motors may be used to provide only lift gas, while one or more additional motors may provide gas flow to gimbal-mounted flow-directing means.

A further feature of the present invention includes the use of eye lid devices in conjunction with flow-directing means such that lift gas directed through a duct well into a plenum chamber beneath the platform is prevented from escaping such plenum chamber when the flow-directing means is oriented in such a manner than an opening otherwise would exist between part of the duct well and the outside atmosphere.

It is, therefore, an object of the present invention to provide new and improved ground effect vehicles.

It is another object of the present invention to provide improved ground effect vehicles having improved controllability.

It is another object of the present invention to provide a ground effect vehicle including a platform, power means for providing a flow of gas, flow-directing means for controlling and directing the flow of gas, and means mounting the flow-directing means such that a portion of the flow of gas can be diverted out above the platform in any selected direction to provide control and propulsion of the vehicle.

It is another object of the present invention to provide a ground effect vehicle including a platform, control means for controlling the attitude of the vehicle about the pitch, yaw and roll axes, and gimbal means for mounting said control means to said platform.

Still another object of the present invention is to provide a ground effect vehicle including a platform, control means for controlling the attitude of the vehicle about the pitch, yaw and roll axes, gimbal means for mounting said control means to said platform, and propulsion means for said vehicle.

A further object of the present invention is to provide a ground effect vehicle including a platform, unitary propulsion and control means for controlling the movement and attitude of the vehicle about the pitch, yaw and roll axes of the vehicle and gimbal means for mounting the propulsion and control means to said platform.

A still further object of the present invention is to provide a ground effect vehicle including a platform; control and lift means for providing a lift force to the vehicle and for controlling the attitude of the vehicle about its pitch, yaw and roll axes, and gimbal means for mounting said lift and control means to said platform.

Another object of the present invention is to provide a ground effect vehicle including a platform, unitary propulsion, lift and attitude control means for said vehicle, and gimbal means for mounting a pair of motor fans on said platform, said motor fans being movable in said gimbal means to provide lift, propulsion and attitude control of said vehicle about its pitch, yaw and roll axes.

These and other objects, features and advantages of the present invention will become readily apparent from a careful consideration of the following detailed description, when considered in conjunction with the accompanying drawings, illustrating preferred embodiments of the present invention, wherein like reference numerals and characters refer to like and corresponding parts through the several views.

BRIEF DESCRIPTION OF THE DRAWINGS

FIG. 1 is a side view in elevation of a preferred embodiment of a ground effect vehicle incorporating the principles of my invention;

FIG. 2 is a top plan view of the embodiment of FIG. 1;

FIG. 3 is a front view in elevation of the embodiment of FIG. 1;

FIG. 4 is a view in perspective of the hull of the embodiment of FIG. 1;

FIG. 5 is a view in partial section taken long line 5—5 of FIG. 2 with parts removed to facilitate illustration;

FIG. 6 is an enlarged fragmentary view taken along line 6—6 of FIG. 2 partially broken to facilitate illustration;

FIG. 7A is a schematic illustration of a preferred form of controls, utilizable in conjunction with the controls of FIG. 7B, for imparting forward or reverse motion to the vehicle of FIG. 1;

FIG. 7B is a schematic illustration of a preferred form of controls to impart turning movement of the vehicle of FIG. 1;

FIG. 8A is a top schematic illustration of operation of the controls of FIG. 7A to impart forward motion to the vehicle of FIG. 1;

FIG. 8B is a side schematic illustration of the vehicle of FIG. 1 showing the operation of the controls of FIG. 7A to impart forward motion to the vehicle of FIG. 1;

FIG. 9A is a top schematic illustration of the vehicle of FIG. 1 showing operation of the control of FIG. 7A to impart reverse motion to the vehicle;

FIG. 9B is a side schematic illustration of the operation of the controls of FIG. 7A to impart reverse motion to the vehicle of FIG. 1;

FIG. 10A is a top view schematic illustration of operation of the controls of FIG. 7B to impart a left turn to the vehicle of FIG. 1;

FIG. 10B is a front view schematic illustration of operation of the controls of FIG. 7B to impart a left turn to the vehicle of FIG. 1;

FIG. 11 is a schematic illustration of the operation of the controls of FIG. 7 to impart lateral moment to the vehicle of FIG. 1;

FIG. 12 is a schematic illustration of the operation of the controls of FIG. 7B to impart a turning motion to the vehicle of FIG. 1 about its vertical axis.

FIG. 13 is a side view in elevation of a single engine ground effect vehicle incorporating the principles of my invention;

FIG. 14 is a top plan view of the embodiment of FIG. 13;

FIG. 15 is a side view in elevation of a flow-directing unit having eye lid means.

FIG. 16 is a side view in elevation cut away and showing the operation of the devide of FIG. 15.

DESCRIPTION OF THE PREFERRED EMBODIMENTS

A ground effect machine or vehicle V, constructed in accordance with the principles of the present invention, appears in FIGS. 1 and 2.

Referring to FIG. 1, there is shown a platform or deck 20 carrying a closed cockpit 22 and a flexible open bottom skirt 24 which entraps and directs the lift air, as is well known in the prior art. The skirt 24 is secured to and circumscribes the periphery of the deck 20, as clearly appears in FIG. 2.

The front end of the deck of the vehicle carries an axial flow motor fan 26 (FIG. 2) and, similarly, the rear end of the deck 20 carries an axial flow motor fan 28. The motor fans 26 and 28 are axially aligned with the longitudinal axis of the deck 20.

The front motor fan 26 is mounted in a gimbal unit, generally indicated by the numeral 30. Similarly, the rear motor fan 28 is mounted in an identical gimbal unit 32. The gimbal arrangements 30 and 32 each include a shroud, shrouds 34 and 36, respectively. The front shroud 34 is mounted for pivotal movement as at 38 and 40 within a pivotal gimbal ring 42. The ring 42 is mounted for pivotal movement on upstanding mounts 44 and 46 (FIGS. 1 and 7B) connected to the deck 20.

The rear motor fan 28 is mounted in the shroud 36 which is, in turn, pivotally mounted as at 48 and 50, within a gimbal ring 52. The gimbal ring 52 is mounted for pivotal movement on upstanding mounts 54 and 56 (FIGS. 1 and 7B) connected to the deck 20.

In accordance with the teaching of the present invention, the two motor fans 26 and 28 will provide air downwardly as indicated by the full line arrows in FIG. 1 to generate maximum lift force to the vehicle when the fan blades 58 and 60 are in a horizontal plane, as indicated in full line showing of the shrouds 34 and 36 in FIG. 1.

By tilting both of the shrouds and motors, as indicated by the dotted line showing of the shrouds 34 and 36 in FIG. 1, a partial slip stream is created as indicated by the dotted line arrow segments in FIG. 1 which is directed horizontally and rearwardly which will provide a forward propulsion motion to the vehicle while maintaining a sufficient lift force with the remainder of the air force generated by the motor fans.

In FIG. 3 the motor fan 26 is shown in a horizontal position in full lines. Pivoting within predetermined limits of the motor fan 26, shroud 34 and ring 42 about the longitudinal axis of the vehicle to provide lateral thrust or propulsion to the vehicle is shown by the dotted lines in FIG. 3 in order to turn the vehicle to the left as viewed in FIG. 3 about its vertical or yaw axis. The motor fan 26, shroud 34 and ring 42 are also pivotable about the longitudinal axis of the vehicle to cause the vehicle to turn to the right, as viewed in FIG. 3, about its vertical axis. Such pivoting of the motor, shroud and ring separates the air discharged from the motor into two components, a lift component directed under the deck 20 and a turning propulsion component directed over the deck 20. Thus both vehicle directional control and yaw axis orientation are provided by the present invention, as well as lift forces.

In FIG. 4 is shown a preferred vehicle inner hull 70. The hull 70 may be molded of fiber glass construction to provide lightness of weight to the vehicle. The hull 70 includes a peripheral wall 90 and two mounting platforms 72 and 74 which are apertured as at 76 and 78 to receive the gimbal units 30 and 32. Between the platforms 72 and 74 is a well 80 defined by side walls 82a and 84a and by platform walls 86 and 88. The well 80 is provided to receive the cockpit equipment, such as controls, pilot seat, electrical equipment, etc. It is noted that with this construction, the well 80 provides a hold or cargo space at a low center of gravity location at the geometric center and provides a low silhouette particularly useful in military operations.

As appears in FIG. 5, the deck 20 is secured by means (not shown) in the walls 82 and 84. The walls 82a and 84a extend the length of the vehicle parallel to the longitudinal axis thereof. It will be appreciated that the hull 70 is provided at its front and rear ends with curved surfaces.

As clearly appears from FIGS. 5 and 6 one edge 91 of the flexible skirt 24 is connected to the deck 20 and the hull wall 90 around the periphery of the hull and extends downwardly to the bottom edge 93 to define an open bottom skirt. The skirt 24 is connected as at 95 to an inner flexible skirt 92 which circumscribes the vehicle and defines with the outer skirt 24 and hull walls 82 and 84 a primary plenum 97. The skirt 24 and inner skirt 92 cooperate with a bottom skirt 96 to define a secondary plenum chamber 104 which is compartmentalized into lift air discharge chambers 104a by vertical dividers 104b in order to control the exit of the lift air from the primary plenum chamber 97. The lift air, as shown by the arrows in FIGS. 5 and 6, is discharged from the fan motor 26 into the space 76a. A portion of the air fills primary plenum 97, from which plenum 97 it passes through apertures 94 to fill the secondary chamber 104 and provides lift to the vehicle V. A second portion of the air is dispersed from space 76a to fill the area 77 disposed between well 80 and bottom skirt 96, which air passes through apertures 102 formed in the bottom skirt 96 to secondary chamber 104 and augments the lift air therein. It will be appreciated that FIGS. 1, 2, 3 and 5 and 6 show the vehicle under conditions when full lift air force is being provided and the skirt is inflated. It will also be appreciated that other skirt constructions may be employed to entrap sufficient air in order to provide the air cushion requirements of the vehicle.

In FIG. 7a is shown one form of control means for actuating pivotal movement of the gimbal unit motors 26 and 28 and shrouds 34 and 36 simultaneously about an axis extended normal to the longitudinal axis of the vehicle in the same directions to provide attitude control of the vehicle in the pitch axis as well as propulsion. It will be appreciated that other controls may be employed to cause movement of the gimbal motors and shrouds either simultaneously or separately. In FIG. 7a is shown a joystick 110 which is movable about a pivot point 112. The joystick 110 has fixedly connected thereto a cable 114 at one point 138. The cable 114 passes over a pulley 120 and through a protective housing 128 carried by the gimbal ring 42. The cable 114 is fixedly connected at point 124 to an arm 126 fixedly carried by the shroud 34. From the point 124, the cable 114 passes through another housing 122 and returns to connection point 138 to complete an endless loop.

The joystick 110 is also connected to an endless loop cable 130 which passes around a pulley 132, through a protective housing 134 which is carried by the rear ring 52. The cable 130 is fixedly connected at point 135 to an arm 136 fixedly carried by the shroud 36. From point 135 the cable passes into another protective housing 137 carried by the ring 52 and returns for connection to the joystick 110 at point 138.

Thus by movement of the joystick to the right, as viewed in FIG. 7a, the cable 114 will move the arm 126 to the right, as viewed in FIG. 7a. Because the arm 126 is fixedly connected to the shroud 34, the arm 126 will cause the shroud 34 to pivot about its horizontal axis to the position shown in FIG. 8b. In so pivoting, the shroud and motor separate the air discharged from the motor into two mean components: (1) a lift component which passes into the skirt 24 and (2) a second component which provides a forward propulsion force to the vehicle.

Conversely, if the joystick 110 is moved forwardly, or to the left as viewed in FIG. 7A, the cable 114 will pivot the arm 126 to the left, as viewed in FIG. 7A, and tilt the motor 26 and shroud 34 about its horizontal axis to the position shown in FIG. 9B, thereby causing the air discharge from the motor 26 to form two components: (1) a lift component which passes into the skirt 24 and (2) a second component which provides a rearward propulsion force to the vehicle.

If the joystick 110, as shown in FIG. 7A, is connected to the shrouds 34 and 36 a forward movement of the joystick 110 (see arrows) will cause movement or pivoting of the motor 28 and shroud 36 simultaneously with the motor 26 and shroud 34 to produce additional forward movement as shown in FIG. 8A. Similarly, if the joystick is connected as shown in FIG. 7A through the cable 130 to rear arm 136, the rear motor 28 and shroud 36 will pivot simultaneously about its horizontal axis and in the same direction as the motor fan 26 and shroud 34 as shown in FIG. 9B upon reverse movement of the joystick 110 (See arrows) to produce an additional rearward propulsion force to the vehicle while maintaining sufficient air discharge for lift purposes.

Resolution of the component forces of the motor fans 26 and 28 under the influence of the control system shown in 7A will provide sufficient lift for the vehicle as well as providing sufficient forward or reverse propulsion forces to the vehicle.

In FIG. 7B is shown one form of controls for providing pivoting motion of the rings 42 and 52 to control movement of the vehicle about its yaw and roll axes. To pivot the ring 42 about its horizontal axis the ring 42, as aforesaid, is pivotally mounted in mount 44 and in mount 46. Ring 42 has an extension 140 which is connected to a pair of rocker or bracket arms 144 and 146. Bracket arms 144 and 146 have mounted thereto a cable 148 which circumscribes a drive shaft 150. Drive shaft 150 has fixedly connected thereto a steering wheel 152.

By turning the steering wheel 152 to right turn, as viewed in FIG. 7B, the ring 42 is caused to pivot about its horizontal axis to the right carrying therewith the shroud 34 and motor 26. Such pivotal movement causes, as indicated in FIG. 10A, the air discharged from the motor 26 to separate into two mean components: (1) a lift component which passes into the skirt 24 and (2) a turning component which passes normal to the longitudinal axis of the vehicle to cause pivoting of the vehicle to the right as viewed in FIG. 10A, about its vertical axis.

In FIGS. 10A and 10B it is assumed that the gimbal unit 32 is maintained in an attitude to provide either lift forces only, or both lift and forward or rearward propulsion forces to the vehicle.

To control movement of the ring 52, FIG. 7B, the ring 52 is, as aforesaid, mounted in a front mount 56 and a rear mount 54 carried by the deck 20. The ring 52 has an extension 156 which carries two arms 158 and 160. Arm 158 has connected thereto a cable 162 which crosses over a cable 164 carried by arm 160. The cable 162 passes under a pulley 166 and the cable 164 passes under a pulley 168. The cable 162 also passes over a pulley 170 and is connected as at 171 to a foot pedal 172 pivotally mounted on a bar 174. Cable 162 and foot pedal 172 are connected to a spring 176 which is fixed to the hull 70 as at 178. The cable 164 extending from pulley 168 passes around a pulley 180 and is connected at point 182 to a foot pedal 184 which is also independently pivotally mounted to the bar 174. The cable 164 and foot pedal 184 are connected to a spring 186 which is fixed as at 188 to the hull 70.

Thus forward movement of the pedal 172 will cause the arm 158 to move downwardly about the axis of the rod 156 and cause movement of the ring 52 to the left as viewed in FIG. 7B. Movement of the ring 52 to thee left will cause the motor 28 and shroud 36 also to move to the left thereby separating the air discharged from the motor 28 into two components: (1) a left component and (2) a propulsion component.

Conversely forward movement of the pedal 184 will cause the ring 52 to pivot about its horizontal axis to the right as viewed in FIG. 7B carrying therewith the motor 28 and shroud 36. Such movement of the ring 52 will cause the air discharged from the motor to separate into two components: (1) a lift component and (2) a propulsion force component which will move the vehicle to the right as viewed in FIG. 7B.

It will, therefore, be appreciated that if both rings 42 and 52 are pivoted in the same direction a lateral force may be imparted to the vehicle which will cause the vehicle to move laterally to the right or left of the longitudinal axis of the vehicle. Also if the rings 42 and 52 are pivoted in opposite directions the propulsion forces generated by the motors 26 and 28 will cause the vehicle to move about the vertical axis of the vehicle either to the right or left depending upon the difference in the degree of pivoting of the rings 42 and 52 in the opposite directions.

The controls of FIGS. 7B, it will be appreciated, provide both yaw and roll control of the vehicle. It will also be appreciated that the controls of FIGS. 7A and 7B may be employed in combination to provide directional stability to the vehicle in the yaw, pitch, and roll axis of the vehicle, as well as providing simultaneously both propulsion in either the forward or reverse direction while maintaining lift forces for the vehicle.

An embodiment of the invention utilizing a single gimbal means is shown in FIGS. 13 and 14. This embodiment is similar in many respects to the vehicle shown in FIGS. 1 and 2. However, a single gimbal means 201 is located near the stern of the vehicle. The gimbal 201 is shown carrying motor 202 and fan 203, and the operation is in most respects similar to that previously described for a twin gimbal vehicle. The gimbal means 201 can be manipulated by controls from the operator's seat 204 to direct air out over the platform 205 in any direction about a vertical axis through the gimbal means 201. The amount of air directed out over the platform can be metered out as desired by operator control of the gimbal means 201, providing propulsion, control, or a combination thereof while still maintaining the necessary lift for the vehicle. The gimbal means 201 is shown as carried on mounts 206 and 207 such that the primary pivot axis is disposed transversely of the longitudinal axis of the vehicle. Fore and aft pivoting about the primary pivot axis to control thrust may be by manual control, or may utilize some sort of servo-motor, preferably operable from the operator's seat 204. Pivoting about the longitudinal pivot axis to provide turning or side forces may be controlled, for example, by the wheel 208 using conventional control linkage.

As shown in FIG. 13, the rim of the duct well aperture from platform 205 into the lift gas chamber, due to the inclined built up wall 212 on deck 205, is canted away from the horizontal plane. This serves two purposes. First, the built up wall 212 acts as an air scoop during forward travel of the vehicle, providing supplementary lift gas. Secondly, the canted rim allows the initial forward thrust setting to have a greater horizontal component than would be the case for a level rim.

As shown in FIGS. 13 and 14, an operator's seat 204 and control panel 209 are mounted for sliding fore-aft adjustment on rails 210 and 211 within the vehicle. Control linkages and instrument lines (not shown) can be carried in a flexible umbilical cord (not shown) connected to the control panel to allow movement of the control panel. This fore-aft movement of operator's seat 204 and control panel 209 provides longitudinal gravity trim control about the pitch axis of the vehicle.

It will be appreciated that the device of FIGS. 13 and 14 does not have the flexibility of control that the device of FIGS. 1 and 2 has. However, it provides most of the advantages of the FIGS. 1 and 2 embodiment, including the capability to provide control from a flow-directing means capable of directing gas flow out over a platform in any direction. Also, the device of FIGS. 13 and 14 has inherent advantages in economy, weight, and ease of construction and operation over other types.

The single engine version of FIGS. 13 and 14 has also been found to work more satisfactorily when the flexible skirt includes a gas receiving plenum chamber extending generally throughout the length and width of the deck and having a bottom closure and distribution means for distributing the lift gas out from the plenum chamber more or less uniformly about the periphery of the flexible skirt.

Another feature of the invention is a provision for reducing loss of lift gas from the lift gas chamber during operation of the vehicle. As shown in FIGS. 15 and 16, gimbal means 201 carries eye lid devices 213 and 214. The eye lid devices 213 and 214 are generally shaped to provide a close sliding fit with the rim of the duct well or aperture 216, and are shown hinged about the transverse pivot axis of gimbal means 201. Eye lid devices 213 and 214 travel with shroud 217 during part of its rotation about its transverse axis such that they close off what would otherwise be an opening from the lift gas chamber to the atmosphere when shroud 217 is pivoted to provide thrust as shown in FIG. 16. As can be seen in FIG. 16, eye lid 214 has an enlarged rim 219 adapted to engage the deck 205 and limit travel of eye lid 214 upon extreme pivoting of shroud 217, thereby closing off a large portion of the duct well 216 and preventing loss of lift gas. Eye lids 213 and 214 are preferably spring-biased to maintain them in contact with the stop means 221 and 220 at the top of shroud 217 until shroud 217 is pivoted and with deck 205 when the shroud is pivoted steeply. It will be appreciated that a single eye lid could be utilized, or an additional pair could be adapted to operate about the longitudinal axis of pivot, providing reduced loss of lift gas during turning. The eye lid devices work equally well on the multi-engine version shown in FIG. 1.

Although specified preferred embodiments of improved ground effect vehicles have been described hereinabove, it is understood that such embodiments are described for purposes of illustration and are not to be considered as limiting of the invention, reference being had to the claims for this purpose.

I claim:

1. Directional control means for a ground effect vehicle, the ground effect vehicle having a platform, a lift gas chamber beneath the platform, and power means adapted to provide a flow of gas to said lift gas chamber; said directional control means comprising:

gimbal means including flow-directing means, said power means providing flow of gas to said flow-directing means, an aperture through said platform, said gimbal means mounted on said platform to position said flow-directing means over said aperture to direct the flow of gas from said power means to said lift gas chamber, said gimbal means operable to direct a desired portion of the flow of gas above said platform while still directing sufficient flow through said aperture to said lift gas chamber for supporting said ground effect vehicle and further operable to change the direction of flow of gas over said platform to change the direction of thrust parallel therewith.

2. Directional control means as claimed in claim 1 having a plurality of spaced apart apertures through said platform, and one of said gimbal means positioned with respect to each of said apertures, and each of said gimbal means operable independently to direct the flow of gas from its flow-directing means above said platform in different directions in a plane parallel therewith.

3. Directional control means as claimed in claim 1 wherein said gimbal means includes a ring, a pair of upstanding mounts, said ring being pivotally mounted above said platform between said upstanding mounts, said flow-directing means including a shroud within said ring pivotally connected thereto, said shroud having a closed wall to define a duct, and first and second control means connected to said ring and said shroud respectively to operate said gimbal means.

4. Directional control means as claimed in claim 3 wherein a portion of said shroud is disposed within said aperture.

5. Directional control means as claimed in claim 4 wherein said wall of said shroud is adapted to extend across said aperture when said gimbal means is controlled to direct a portion of the flow of gas above said platform, the wall thereby restricting said aperture, the wall being moved gradually from its position across said aperture as said flow-directing means is controlled to direct an increasing proportion of the flow of gas into said lift gas chamber.

6. A directional control means as claimed in claim 5 wherein eye lid means is positioned about said wall of said shroud and is movable to extend from said wall to further restrict said aperture.

7. A directional control means as claimed in claim 6 wherein said shroud includes a plurality of eye lid means, each of said eye lid means having a stop to limit the travel of the respective eye lid means.

8. Directional control means as claimed in claim 4 wherein said power means is a motor and fan mounted within said shroud to provide flow of gas, and said first and second control means being operable to tilt said motor and fan for tilting the flow of gas therefrom.

9. A ground effect vehicle as defined in claim 1 wherein an adjustable seat means is movable over said platform for improving trim capabilities of the vehicle.

10. A ground effect vehicle as defined in claim 9 wherein the vehicle has a travelling control station including said seat means, instruments and control movable as a unit.

* * * * *

UNITED STATES PATENT OFFICE
CERTIFICATE OF CORRECTION

Patent No. 3,827,527　　　　　　　　　Dated August 6, 1974

Inventor(s) William R. Bertelsen

It is certified that error appears in the above-identified patent and that said Letters Patent are hereby corrected as shown below:

In column 12, line 21, in the claims of the specification, the word "control" should be corrected to read --controls--.

Signed and sealed this 10th day of December 1974.

(SEAL)
Attest:

McCOY M. GIBSON JR.　　　　　　　C. MARSHALL DANN
Attesting Officer　　　　　　　　Commissioner of Patents